(12) United States Patent
Martin et al.

(10) Patent No.: US 7,653,608 B2
(45) Date of Patent: Jan. 26, 2010

(54) SYSTEM AND METHOD FOR RANKING ACADEMIC PROGRAMS

(75) Inventors: Lawrence B. Martin, Stony Brook, NY (US); Anthony J. Olejniczak, Leipzig (DE)

(73) Assignee: Research Foundation of the State University of New York, Stony Brook, NY (US)

( * ) Notice: Subject to any disclaimer, the term of this patent is extended or adjusted under 35 U.S.C. 154(b) by 459 days.

(21) Appl. No.: 11/389,815

(22) Filed: Mar. 27, 2006

(65) Prior Publication Data

US 2006/0265237 A1 Nov. 23, 2006

Related U.S. Application Data

(60) Provisional application No. 60/665,224, filed on Mar. 25, 2005.

(51) Int. Cl.
 *G06N 5/00* (2006.01)
(52) U.S. Cl. .................................................. 706/45
(58) Field of Classification Search ............... 706/12, 706/14, 45
 See application file for complete search history.

(56) References Cited

U.S. PATENT DOCUMENTS

| | | | | |
|---|---|---|---|---|
| 5,884,282 A | * | 3/1999 | Robinson | 705/27 |
| 2008/0133417 A1 | * | 6/2008 | Robinson | 705/52 |

OTHER PUBLICATIONS

Susan F. Weeks et al., Developing Peer Groups for the Oregon University System: From Politics to Analysis (and back), Feb. 2000, Research in Higher Education, vol. 41, No. 1, 1-20.*
Randy Taylor et al., Using Mathematics and Statistics to Analyze Who are the Great Sluggers in Baseball, 2004, Las Positas College, four pages.*
Kevin W. Eva, Where Judgement Fails: Pitfalls in the Selection Process for Medical Personnel, 2004, Advances in Health Sciences Education, 161-174.*

* cited by examiner

*Primary Examiner*—David R Vincent
*Assistant Examiner*—Benjamin Buss
(74) *Attorney, Agent, or Firm*—F. Chau & Associates, LLC

(57) ABSTRACT

A computer-implemented method for ranking a plurality of academic programs includes receiving a plurality of records corresponding to the plurality of academic programs, respectively, combining elements of the plurality of records to determine respective z-scores according to a predetermined metric, and ranking the plurality of academic programs according to the respective z-scores.

13 Claims, 5 Drawing Sheets

| Forest Sciences & Management | Publications | | Journal Citations | | | Federal Research Funding | | | FSP |
|---|---|---|---|---|---|---|---|---|---|
| | %FacwPub | JPubs/Fac | %FacwCit | Cits/Pub | Cits/Fac | %FacwGrt | #Grt/Fac | $SGrt/Fac | |
| Mean | 0.56 | 1.89 | 0.32 | 0.88 | 1.81 | 0.10 | 0.17 | $42,639.03 | |
| Standard Deviation | 0.15 | 0.79 | 0.15 | 0.47 | 1.45 | 0.01 | 0.25 | $60,184.76 | |
| Weight in FSP | 17.00% | 17.00% | 11.00% | 11.00% | 11.00% | 11.00% | 11.00% | 11.00% | |
| Institution | z-score | z-score | z-score | z-score | z-score | z-score | z-score | z-score | z-score |
| Peer 1 | 1.41 | 2.43 | 1.81 | 1.79 | 3.27 | 2.27 | 1.93 | 2.15 | 2.25 |
| First Decile Mean | 1.54 | 2.29 | 1.72 | 2.01 | 2.65 | 2.28 | 2.99 | 2.85 | 2.09 |
| Peer 2 | 1.64 | 2.12 | 1.61 | 0.85 | 1.90 | 0.89 | 0.35 | 0.82 | 1.90 |
| Peer 3 | 0.84 | 0.47 | 1.05 | 1.01 | 0.86 | 0.01 | -0.24 | -0.13 | 1.22 |
| Your University | 0.19 | 0.49 | -0.30 | 0.13 | 0.23 | 2.28 | 1.66 | 3.42 | 1.04 |
| Second Decile Mean | 0.98 | 0.79 | 1.00 | 1.07 | 0.83 | 1.20 | 0.50 | 1.09 | 1.03 |
| Peer 4 | 0.68 | 0.65 | 0.71 | -0.22 | 0.04 | 1.05 | 0.12 | -0.04 | 1.02 |
| Peer 5 | -0.47 | 0.40 | -0.04 | 2.19 | 1.66 | 1.28 | 0.47 | -0.19 | 0.81 |
| Peer 6 | -0.28 | 0.71 | 0.61 | -0.01 | 0.24 | 0.89 | 0.20 | 0.53 | 0.77 |
| Third Decile Mean | 0.65 | 0.61 | 0.74 | 0.76 | 0.26 | 0.78 | 0.18 | 0.37 | 0.74 |
| Peer 7 | 0.55 | 0.81 | 0.64 | -0.34 | 0.01 | -0.22 | -0.29 | -0.35 | 0.64 |
| Peer 8 | -0.55 | 0.75 | 0.76 | -0.57 | -0.20 | 0.45 | -0.11 | 0.43 | 0.41 |
| Fourth Decile Mean | 0.39 | 0.43 | 0.59 | 0.44 | 0.05 | 0.09 | -0.12 | -0.14 | 0.38 |
| Peer 9 | 1.05 | 1.11 | 0.89 | -0.57 | -0.08 | -0.68 | -0.54 | -0.68 | 0.38 |
| Peer 10 | 0.06 | 0.25 | 0.18 | 1.10 | 0.77 | -0.15 | -0.34 | -0.69 | 0.35 |
| Fifth Decile Mean | 0.18 | 0.07 | 0.17 | 0.12 | -0.08 | -0.01 | -0.26 | -0.35 | 0.28 |
| Sixth Decile Mean | -0.02 | -0.17 | -0.24 | -0.21 | -0.18 | -0.31 | -0.40 | -0.43 | -0.08 |
| Seventh Decile Mean | -0.13 | -0.48 | -0.33 | -0.51 | -0.57 | -0.59 | -0.49 | -0.64 | -0.61 |
| Eighth Decile Mean | -0.53 | -0.71 | -0.77 | -0.79 | -0.71 | -0.96 | -0.64 | -0.70 | -0.91 |
| Ninth Decile Mean | -1.07 | -1.16 | -1.11 | -1.19 | -0.95 | -1.05 | -0.68 | -0.71 | -1.00 |
| Tenth Decile Mean | -2.32 | -1.71 | -1.76 | -1.59 | -1.18 | -1.05 | -0.68 | -0.71 | -1.63 |

FIGURE 5

| Broad Category: Health Professions Sciences | Publications | | Journal Citations | | | Federal Research Funding | | | FSP |
|---|---|---|---|---|---|---|---|---|---|
| | %FacwPub | JPubs/Fac | %FacwCit | Cits/Pub | Cits/Fac | %FacwGrt | #Grt/Fac | $SGrt/Fac | |
| Mean | 0.35 | 1.24 | 0.21 | 1.31 | 2.56 | 0.10 | 0.25 | $68,130.69 | |
| Standard Deviation | 0.23 | 1.54 | 0.20 | 1.58 | 5.48 | 0.12 | 0.37 | $158,469.53 | |
| Weight in FSP | 17.00% | 17.00% | 11.00% | 11.00% | 11.00% | 11.00% | 11.00% | 11.00% | |
| Institution | z-score | z-score | z-score | z-score | z-score | z-score | z-score | z-score | z-score |
| Peer 1 | 2.47 | 4.56 | 3.01 | 1.34 | 4.72 | 3.54 | 4.33 | 3.92 | 1.89 |
| Peer 2 | 2.45 | 2.50 | 2.74 | 1.28 | 2.65 | 3.01 | 3.19 | 4.26 | 1.84 |
| Your University | 1.94 | 1.67 | 2.27 | 1.50 | 2.10 | 3.89 | 4.83 | 4.06 | 1.82 |
| Peer 3 | 1.43 | 1.97 | 1.75 | 1.20 | 2.05 | 1.40 | 1.75 | 2.25 | 1.69 |
| Peer 4 | 1.65 | 1.76 | 2.13 | 0.69 | 1.27 | 1.44 | 1.80 | 2.00 | 1.67 |
| First Decile Mean | 1.80 | 2.07 | 2.17 | 1.40 | 2.07 | 1.75 | 1.77 | 2.01 | 1.67 |
| Peer 5 | 1.80 | 2.94 | 2.22 | 1.05 | 2.67 | 0.94 | 0.93 | 0.98 | 1.67 |
| Peer 6 | 1.55 | 1.18 | 1.69 | 0.83 | 0.99 | 3.29 | 4.33 | 5.40 | 1.67 |
| Peer 7 | 1.81 | 2.21 | 1.91 | 0.52 | 1.35 | 1.20 | 1.22 | 1.65 | 1.65 |
| Peer 8 | 1.33 | 1.57 | 1.49 | 0.83 | 1.29 | 1.45 | 1.69 | 2.24 | 1.60 |
| Peer 9 | 1.33 | 1.63 | 1.69 | 0.66 | 1.15 | 1.31 | 0.93 | 1.50 | 1.55 |
| Peer 10 | 1.73 | 1.73 | 1.20 | 0.27 | 0.77 | 1.52 | 1.07 | 0.40 | 1.53 |
| Second Decile Mean | 1.17 | 0.74 | 1.16 | 0.77 | 0.31 | 1.02 | 0.81 | 0.60 | 1.16 |
| Third Decile Mean | 0.66 | 0.10 | 0.56 | 0.31 | -0.05 | 0.49 | 0.27 | 0.02 | 0.77 |
| Fourth Decile Mean | 0.34 | -0.07 | 0.04 | 0.00 | -0.22 | 0.06 | -0.07 | -0.15 | 0.52 |
| Fifth Decile Mean | 0.04 | -0.27 | -0.15 | -0.22 | -0.32 | -0.18 | -0.33 | -0.35 | 0.18 |
| Sixth Decile Mean | -0.29 | -0.42 | -0.39 | -0.38 | -0.39 | -0.41 | -0.44 | -0.43 | -0.10 |
| Seventh Decile Mean | -0.52 | -0.56 | -0.60 | -0.49 | -0.42 | -0.64 | -0.54 | -0.50 | -0.57 |
| Eighth Decile Mean | -0.82 | -0.63 | -0.76 | -0.58 | -0.44 | -0.86 | -0.68 | -0.56 | -0.92 |
| Ninth Decile Mean | -1.12 | -0.70 | -0.90 | -0.68 | -0.46 | -0.86 | -0.68 | -0.56 | -1.20 |
| Tenth Decile Mean | -1.48 | -0.79 | -1.06 | -0.83 | -0.47 | -0.86 | -0.68 | -0.56 | -1.60 |

FIGURE 6

SYSTEM AND METHOD FOR RANKING ACADEMIC PROGRAMS

CROSS REFERENCE TO RELATED APPLICATION

This application claims the benefit of U.S. Provisional Application, Ser. No. 60/665,224 filed on Mar. 25, 2005 in the United States Patent and Trademark Office, the contents of which are herein incorporated by reference in its entirety.

BACKGROUND OF THE INVENTION

1. Technical Field

The present invention relates to ranking educational institutions, including programs and faculty, and more particularly to a system and method for ranking academic programs.

2. Discussion of Related Art

Various publications, organizations and individuals rank universities and graduate schools. The rankings are typically used as tools by administrators to assess the quality of their programs and universities, and by students to determine which schools and programs to make applications to.

Existing methods for ranking universities utilize census forms distributed to faculties. Faculty members rank universities and programs according to their impressions. These impressions may be based on any number of factors, including lack of information. These impressions introduce uncertainties and bias into the rankings.

The 1995 National Research Council Assessment of Research Doctorate Programs collected data on faculty publications, citations and grants. In 1997, Graham and Diamond (the Rise of the American Research University, Johns Hopkins) ranked universities based on per capita publications in top journals and per capita awards and honors in humanities fields. In 2000, Diamond and Graham (Change Magazine) ranked graduate programs and universities based on citation data from the 1995 NRC study. Such rankings may be statistically inaccurate for many comparisons.

Therefore, a need exists for a standardized system and method for ranking graduate programs.

SUMMARY OF THE INVENTION

According to an embodiment of the present disclosure, a computer-implemented method for ranking a plurality of academic programs comprises receiving a plurality of records corresponding to the plurality of academic programs, respectively, combining elements of the plurality of records to determine respective z-scores according to a predetermined metric, and ranking the plurality of academic programs according to the respective z-scores.

According to an embodiment of the present disclosure, a program storage device is provided readable by machine, tangibly embodying a program of instructions executable by the machine to perform method steps for ranking a plurality of academic programs, the method steps comprising receiving a plurality of records corresponding to the plurality of academic programs, respectively, combining elements of the plurality of records to determine respective z-scores according to a predetermined metric, and ranking the plurality of academic programs according to the respective z-scores.

According to an embodiment of the present disclosure, a report comparing a plurality of academic programs is obtained by a method comprising receiving a plurality of records corresponding to the plurality of academic programs, respectively, combining elements of the plurality of records to determine respective z-scores according to a predetermined metric, and ranking the plurality of academic programs according to the respective z-scores.

BRIEF DESCRIPTION OF THE DRAWINGS

Preferred embodiments of the present invention will be described below in more detail, with reference to the accompanying drawings:

FIG. 5 is a discipline level report according to an embodiment of the present disclosure; and FIG. 6 is a broad category level report according to an embodiment of the present disclosure.

DETAILED DESCRIPTION OF PREFERRED EMBODIMENTS

Figure 1:
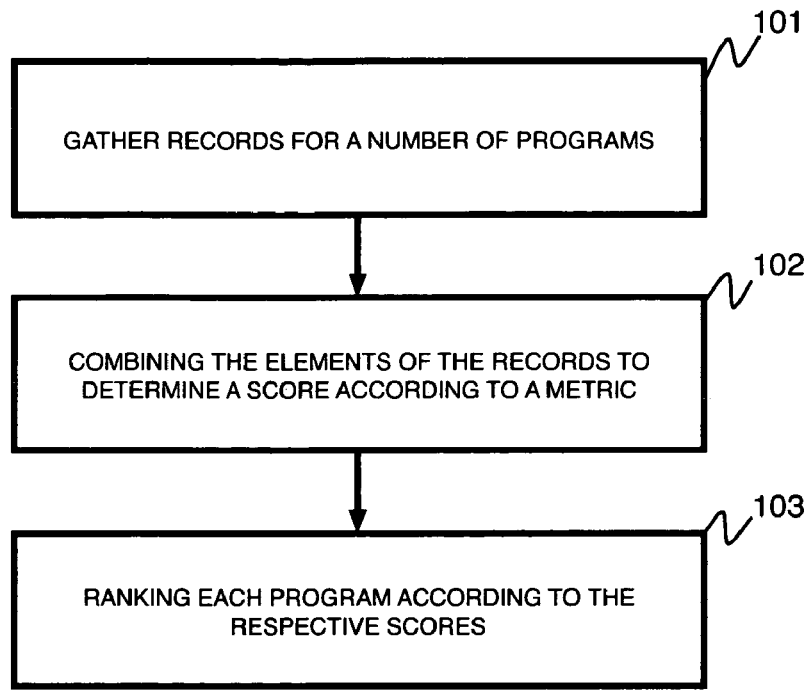
FIG. 1 is a flow chart of a method according to an embodiment of the present disclosure.

According to an embodiment of the present disclosure, a method for ranking academic programs includes gathering records for a number of programs 101, combining elements of the records to determine a score according to a predetermined metric 102, and ranking each program according to respective scores 103 (see FIG. 1).

Figure 2:
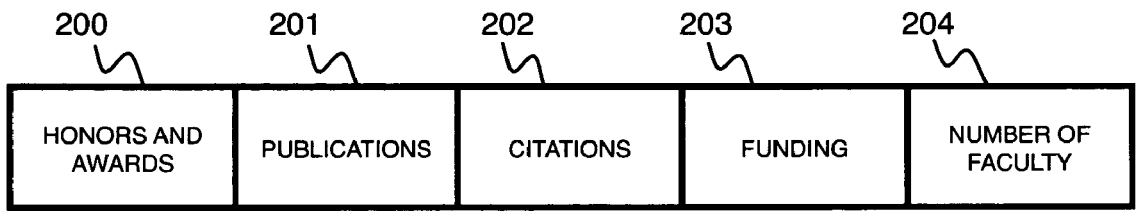
FIG. 2 is an illustration of a record according to an embodiment of the present disclosure.

Referring to FIG. 2, each record includes one or more of an indication of honors and awards 200, a number of publications (e.g., books and journal articles) for the respective program 201, a number of citations for each publication 202, an amount of funding received by the program 203, and a number of faculty contributing to the respective program 204. Additional data may be included in each record such as the number of books published, the number of honors and awards received.

Among the academic programs, the metric standardizes the number of publications, the number of citations of the publications and the funding received by the program by dividing by the number of faculty in the program. A small program may be compared to a large program based on a standard measure of scholastic productivity that accounts for the size of the program, e.g., the number of faculty. A variety of metrics for each area of activity (e.g., publications, citations, funding) may be created. These are evaluated using a partial correlation analysis to determine a desirable metric for the particular discipline or field. The partial correlation analysis determines a correlation of two variables, e.g., funding and a number of publications while controlling for a third or more other variables, e.g., program size.

The desired metric is then used to rank a number of programs, e.g., all programs in the country, for a given field using Z-scores. Z-scores are a measure of how many standard deviations an observation is away from a mean. A balanced index of faculty scholarly productivity, equally weighted among publications citations and funding, is then determined. The method may be implemented as a metric, hereafter, Martin Faculty Scholarly Productivity (FSP) Index, as follows:

FSP=the average of the sum of a number of journal publications, a number of journal citations, and program funding. It should be noted that the values contributing to the sum have been standardized by the number of faculty in the respective programs.

Another example, of a metric may be written as:

FSP=the average of the sum of a number of books published, honors/awards received, and journal publications and citations. Such a metric can be used to rank humanities programs, where funding may not be an accurate measure of a program.

Variations of the Martin FSP Index can be developed, for example, weighing funding more heavily than publications. A weighting may be implemented such that different types of programs may be compared based on the standard measure of scholastic productivity. For example, a standardized comparison of an arts program and a physics program may be performed between different universities or within the same university.

Referring to FIGS. 5 and 6, an exemplary report includes information on the methodology and data elements used to create the FSP Index and sample reports showing a full institution table, an internal program comparison table, six discipline-level FSP tables, and one broad category FSP table. These exemplary tables provide information on seventeen of the top 5 schools in the database based on 5 Ph.D. granting institutions. One skilled in the art would appreciate that a different composition of reports/tables may be generated.

A full client report shows the client's named peers as well as the national decile means for each discipline in which the institution has a Ph.D. program (in the exemplary tables shown under "YOUR UNIVERSITY").

The full client report can include FSP tables for every discipline within an institution that has been rated at either the first, second, or third level of Academic Analytics' taxonomy, benchmarked against the client's peer group and national decile averages. The full client report can include FSP tables for broad fields (aggregates of programs) benchmarked against the client's peer group and national decile averages. The full client report can include an FSP Internal Analysis graphic showing a comparative ranking of all the client's programs to each other based on their performance nationally, and an FSP table showing an institution level ranking of the client's university against the client's peer group and national decile averages.

Table 1 is a portion of an exemplary taxonomy showing the discipline of Social and Behavioral Sciences according to an embodiment of the present disclosure. From Table 1, the field of Psychology includes Clinical Psychology, Counseling Psychology, and Educational Psychology, and Social Sciences includes Anthropology, Economics, Geography, Political Science, Public Policy & Government and Sociology.

TABLE 1

| Social and Behavioral Sciences | |
|---|---|
| Psychology | Clinical Psychology |
|  | Counseling Psychology |
|  | Educational Psychology |
| Social Sciences | Anthropology |
|  | Economics |
|  | Geography |
|  | Political Science, Public Policy & Govt. |
|  | Sociology |

The taxonomy for the FSP Index was developed to cover as many fields of study as possible while still allowing it to provide meaningful results. The taxonomy has three levels, though different taxonomies may be developed. Disciplines are assigned a lowest possible level for the program. Eighty-five disciplines are covered at level one and an additional twenty-two (e.g., Psychology) first appear at levels two or three). From level one, disciplines can be aggregated to a higher level to match the structure of the institution being analyzed. Thus, for example, a program with a combined biomedical sciences Ph.D. program can be compared with institutions that have individual programs in the various fields of biomedical sciences with these being aggregated up to create a virtual biomedical sciences program for those schools.

Figure 3:
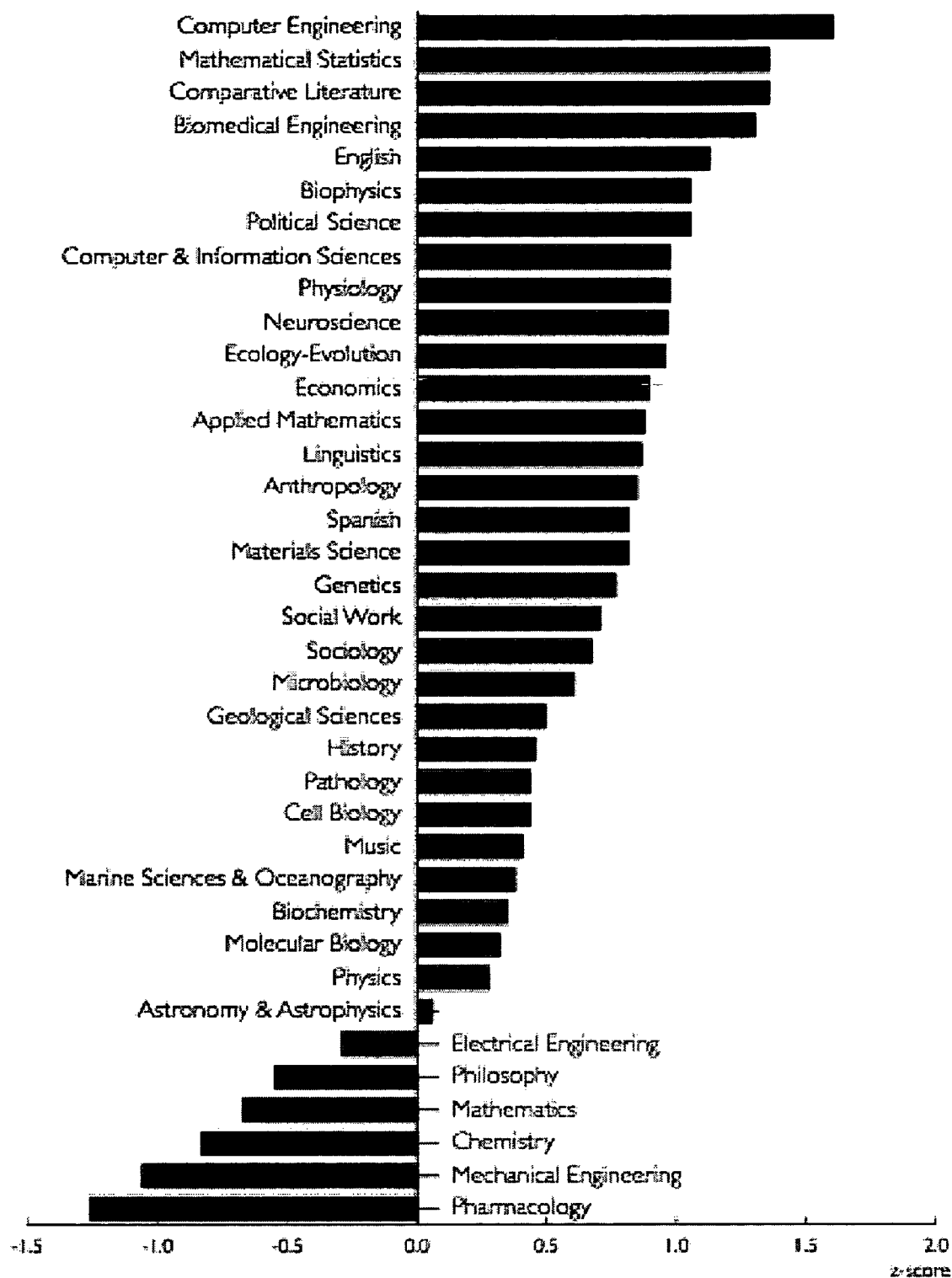
FIG. 3 is a graph of an internal program comparison according to an embodiment of the present disclosure.

FIGS. 5 and 6 are exemplary embodiments of reports showing data for a client institution, ten named peer institutions (fewer or additional peers may be made available), and the national means for each decile within each discipline and broad category where they have a program. An internal analysis table can also be provided, comparing the client institution's programs against each other (see FIG. 3), and an institution level analysis shows the position of the client institution (as an aggregate of its underlying programs) on a national scale.

FIG. 5 is a discipline level report according to an embodiment of the present disclosure.

FIG. 6 is a broad category level report according to an embodiment of the present disclosure.

While FIGS. 5 and 6 have a nation scope, the scope may be restricted or broadened, for example, other scopes may include New England academic programs or North American academic programs.

Referring to FIGS. 5 and 6 exemplary records are shown comprising elements. The elements shown are exemplary, and different elements may be used.

The element "%FacwPubs" indicates a percentage of faculty listed for the program to whom either a journal or book publication was matched. Reported as a z-score (standard deviation units) to allow comparison with metrics for citations, funding, and awards. The value of the mean (z-score of 0) and of the standard deviation (SD=1,=z-score 1.0) in real units are given so as to permit comparison of activity levels among institutions in real units. Real unit comparisons should not be made across columns. These data are calculated based on journal publications for the years 2003 and 2004 and books published by university presses 2000-2004.

The element "JPubs/Fac" indicates a total number of journal publications matched to faculty in the program divided by the numbed of faculty listed for the program, presented in z-score units.

The element "BPubs/Fac" indicates a total number of book publications matched to faculty in the program divided by the number of faculty listed for the program presented in z-score units.

The weighting between JPubs and BPubs is empirically based. For example, a book may be counted as five articles. The percentage of journal articles and books per year is then the basis for weighting the two measures. If either measure exceeds 90% of publishing activity for the discipline then that measure alone is used.

Citations (e.g., used for disciplines in which at least 40% of programs have citations attributed to their faculty):

The element "%FacwCit" indicates a number of faculty whose journal articles have citations as a percentage of faculty listed for the program presented in z-score. These data are determined based on journal publications for the years 2003-2004.

The element "Cits/Pub" indicates a number of journal article citations divided by the number of journal publications; these data are determined based on citation records for the years 2003 and 2004, presented in z-score units.

The element "Cits/Fac" indicates a number of journal citation per faculty member; these data are determined based on citation records for the years 2003 and 2004, presented in z-score units.

Federal Research Funding (e.g., used for disciplines in which at least 40% of programs have a funding awards attributed to their faculty):

The element "%FacwGrt" indicates a number of faculty with new grants from the NIH, NSF or USDA as a percentage of the total faculty listed for the program in z-score units.

The element "#Grt/Fac" indicates a total number of new NIH, NSF, USDA awards divided by the total faculty listed for the program in z-score units.

The element "$$Grt/Fac" indicates the total dollar value of new grants obtained by faculty in the program divided by the total faculty listed for the program in z-score units.

Awards & Honors (e.g., used for disciplines that have at least ten awards or honors in the field and in which at least 20% of programs have awards or honors attributed to their faculty):

The element "Awd/Fac" indicates a z-score of the number of awards per faculty member. These data are collected from award-granting institutions as detailed in the Awards & Honors included in the FSP Index™ section.

Within FIGS. 5 and 6, the column "FSP" indicates a z-score for the weighted average of the ranks for each of the preceding measures.

Within FIGS. 5 and 6, the row "Weight in FSP" indicates a percentage weight applied to each data measure in the FSP index for that discipline.

The z-score is a standardized measure derived by subtracting the sample mean from an individual (raw) score and dividing this difference by the sample standard deviation: The z-score thus represents the number of standard deviation between the individual score and the mean; it is negative when the individual score is below the mean, positive when above. A z-score of 1.0 indicates a score that is 1 standard deviation above the mean. A z-score of 2 indicates 2 standard deviations above the mean. The z-scores allow comparison of relative performance between journal articles published and research dollars awarded.

At level four, institutional comparisons, the FSP score shown is the average of the FSP z-score for every program at that institution at the first level at which it appears.

It is to be understood that a ranking method may be implemented in various forms of hardware, software, firmware, special purpose processors, or a combination thereof. In one embodiment, a ranking method may be implemented in software as an application program tangibly embodied on a program storage device. The application program may be uploaded to, and executed by, a machine comprising any suitable architecture.

Figure 4:
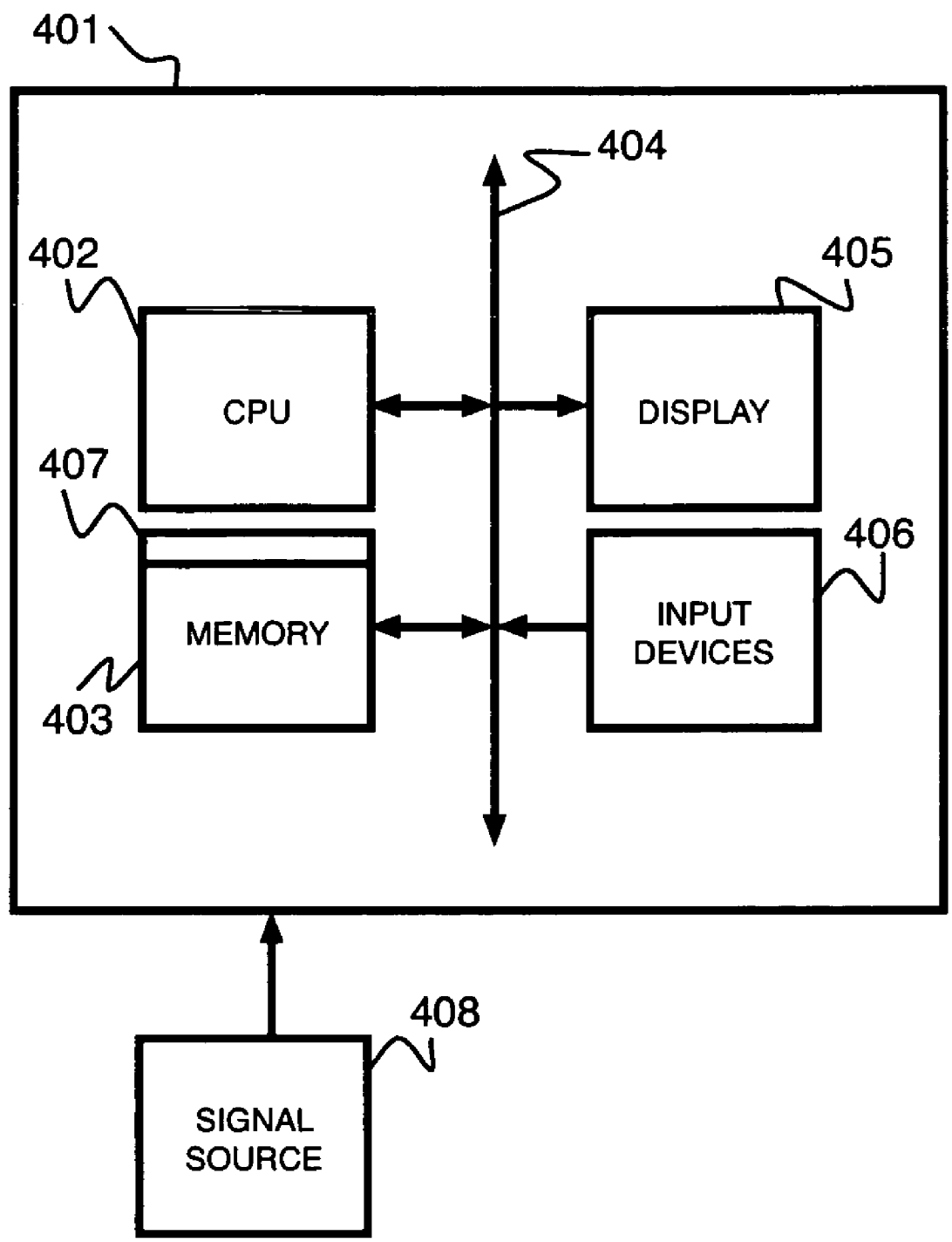
FIG. 4 is a diagram of a system according to an embodiment of the present disclosure.

Referring to FIG. 4, according to an embodiment of the present disclosure, a computer system 401 for implementing a ranking method can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process the signal from the signal source 408. As such, the computer system 401 is a general-purpose computer system that becomes a specific purpose computer system when executing the routine 407 according to an embodiment of the present disclosure.

The computer platform 401 also includes an operating system and micro-instruction code. The various processes and functions described herein may either be part of the micro-instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for ranking graduate programs, it is noted that modifications and variations can be made by persons skilled in the art in light of the above teachings. It is therefore to be understood that changes may be made in embodiments disclosed herein which are within the scope and spirit of the disclosure.

What is claimed is:

1. A computer-implemented method for ranking a plurality of academic programs comprises:
   receiving a plurality of records corresponding to the plurality of academic programs, respectively, each of the plurality of records comprising a plurality of elements;
   determining a range of data for each element across the plurality of academic programs;
   determining a rank of each of the plurality of academic programs for each element;
   determining an average rank from the ranks determined for each of the plurality of academic programs;
   determining a mean and standard deviation of the average ranks of the plurality of academic programs in each of a plurality of disciplines, wherein each discipline includes a number of the plurality of programs; and
   scoring each of the plurality of academic programs according to the standard deviation and the average ranks, wherein score of the plurality of academic programs are comparable across the disciplines.

2. The computer-implemented method of claim 1, further comprising providing a taxonomy of the plurality of academic programs.

3. The computer-implemented method of claim 2, wherein the taxonomy of the plurality of academic programs comprises a plurality of hierarchical levels of academic programs.

4. The computer-implemented method of claim 1, further comprising ranking an entity as a collection of academic programs against at least one other entity.

5. The computer-implemented method of claim 1, further comprising determining a sub-score for each of the elements based on a mean measurement and standard deviation of the elements.

6. The computer-implemented method of claim 5, wherein the score is determined as an average of the sub-scores of each element of a corresponding record.

7. The method of claim 1, determining the average rank for each of the plurality of academic programs farther comprises ranking the plurality of academic programs within a discipline according to the average rank.

8. The method of claim 1, determining the average rank for each of the plurality of academic programs farther comprises weighting the elements.

9. The method of claim 1, wherein the scores of the plurality of academic programs are comparable across the disciplines even when different disciplines have different numbers of programs.

10. A computer readable medium embodying a program of instructions executed by a processor to perform method steps for ranking a plurality of academic programs, the method steps comprising:

receiving a plurality of records corresponding to the plurality of academic programs, respectively, each of the plurality of records comprising a plurality of elements;

determining a range of data for each element across the plurality of academic programs;

determining a rank of each of the plurality of academic programs for each element;

determining an average rank from the ranks determined for each of the plurality of academic programs;

determining a mean and standard deviation of the average ranks of the plurality of academic programs in each of a plurality of disciplines, wherein each discipline includes a number of the plurality of programs; and scoring each of the plurality of academic programs according to the standard deviation and the average ranks, wherein scores of the plurality of academic programs are comparable across the disciplines.

11. The computer readable medium of claim 10, wherein determining the average rank for each of the plurality of academic programs further comprises ranking the plurality of academic programs within a discipline according to the average rank.

12. The computer readable medium of claim 10, wherein determining the average rank for each of the plurality of academic programs further comprises weighting the elements.

13. The computer readable medium of claim 10, wherein the scores of the plurality of academic programs are comparable across the disciplines even when different disciplines have different numbers of programs.

* * * * *